United States Patent Office 3,009,911
Patented Nov. 21, 1961

---

3,009,911
DERIVATIVES OF 3,4-DIHYDRO-1,2,4-BENZO-THIADIAZINE-1,1-DIOXIDE

James M. McManus, Uncasville, Conn., assignor to Chas. Pfizer & Co., Inc., Brooklyn, N.Y., a corporation of Delaware
No Drawing. Filed Jan. 4, 1961, Ser. No. 80,547
4 Claims. (Cl. 260—243)

This invention is concerned with a new class of highly effective therapeutic agents as well as the method of preparing same. In particular, the therapeutic agents of this invention are 6-substituted - 3 - (2,2,2-trifluoroethyl)thiomethyl - 7 - sulfamyl - 3,4 - dihydrobenzo-1,1-dioxo-1-thia-2,4-diazines. The compounds, hereinafter referred to as 6-substituted - 3 - (2,2,2-trifluoroethyl)thiomethyl-7-sulfamyl - 3,4 - dihydrobenzothiadiazine dioxides are represented by the following formula:

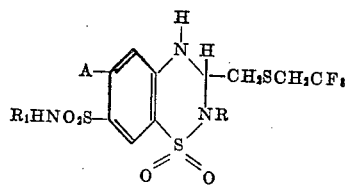

wherein A is selected from the group consisting of hydrogen, Cl, Br, trifluoromethyl and alkyl and alkoxy each containing 1 to 3 carbon atoms and R and $R_1$ are each selected from the group consisting of hydrogen, methyl and ethyl.

It is also intended to include within the scope of this invention salts of the above class of compounds. Particularly valuable are salts formed with bases containing a pharmaceutically acceptable cation.

The 6 - substituted-3-(2,2,2-trifluoroethyl)thiomethyl-7-sulfamyl-3,4-dihydrobenzothiadiazine dioxides of this invention may be prepared by the reaction of a substituted aniline of the formula:

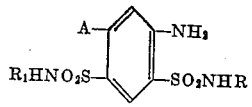

in which A, R and $R_1$ are as described above, with an aldehyde of the formula:

$$CF_3CH_2SCH_2CHO$$

Alternatively, corresponding aldehyde derivatives may be employed in place of the aldehyde, for example, lower-alkyl acetals of these aldehydes, which may be generally represented by the formula $CF_3CH_2SCH_2CH(OR_2)_2$ in which $R_2$ is lower alkyl. The reaction is preferably effected by heating a substantially equimolar mixture of the reactants in an inert organic solvent at a temperature of from about 60° C. to about 120° C. Usually, a reaction time of from about ½ to about 5 hours is found to give excellent yields of the desired products. Longer reaction time may be used without appreciable advantage. Slight excess of aldehyde, or derivative, for example up to 10% may be used, but larger excesses should be avoided since their use may lead to reduced yield of the desired product.

By inert organic solvents as employed herein is meant an organic solvent which dissolves the reactants but does not react with same under the reaction conditions described. Such solvents may be readily determined by routine experimentation in the laboratory. Although other solvents may be employed, excellent results are obtained with N,N-dialkylloweralkanoamides, such as dimethylformamide, diethylacetamide, dipropylpropionamide, diethylformamide and the like, as well as alkylated glycols, such as the dimethyl ether of butylene glycol, the dipropyl ether of ethyleneglycol and the like. When the acetals are used in place of the aldehydes, it is generally preferred to add a minor amount of aqueous mineral acid. Usually only a few drops of aqueous acid, such as hydrochloric, sulfuric, phosphoric and the like, is found sufficient.

After the reaction is complete, the products are obtained by conventional methods, such as concentration and crystallization. The products may then be recrystallized from suitable solvents.

The present new compounds are found to be diuretic agents of high potency. They not only effect an increase in urine excretion but also effect a more favorable electrolyte excretion pattern with increased natriuresis and chloruresis without a commensurate increase in kaliuresis. This electrolyte excretion pattern is highly desirable since, as is generally known in the medical art, the use of many of the more potent diuretic agents generally leads to depletion of potassium in the body which condition is known as hypokalemia. The greater potency of the present new compounds is illustrated by a comparison of 3-(2,2,2 - trifluoroethyl)thiomethyl-6-chloro-7-sulfamyl-3,4-dihydrobenzothiadiazine-1,1-dioxide with known diuretic agents, e.g. benzthiazide (3-benzylthiomethyl-6-chloro-7-sulfamylbenzothiadiazine-1,1-dioxide), 3-benzylthiomethyl- and 3-ethylthiomethyl-6-chloro-7-sulfamyl-3,4-dihydrobenzothiadiazine-1,1-dioxide, and dihydrochlorthiazide (6-chloro - 7 - sulfamyl-3,4-dihydrobenzothiadiazine-1,1-dioxide), all of which are known to be potent diuretic agents.

The aforementioned trifluoroethyl compound of this invention is 9 times more potent than benzthiazide in chloruresis when tested in dogs with 95% confidence limits of 4–27 and 6 times more potent than benzthiazide in natriuresis when tested in dogs with 95% confidence limits of 2–12. Similar results are obtained in comparisons of the present compound with the remaining reference compounds. In these comparisons, kaliuresis with the present new compound did not increase commensurately with the increase in natriuresis and chloruresis.

Of even greater potency and longer duration of action, are 2-methyl and 2-ethyl-3-(2,2,2-trifluoroethyl)thiomethyl-6-substituted - 7 - sulfamyl - 3,4 - dihydrobenzothiadiazine-1,1-dioxides such as 2-methyl-3-(2,2,2-trifluoroethyl)-thiomethyl - 6 - chloro-7-sulfamyl-3,4-dihydrobenzothiadiazine-1,1-dioxide (M.P. 202–203° C.) and the corresponding 2-ethyl compound (M.P. 186–188° C.). For example, in rats, 2-methyl-3-(2,2,2-trifluoroethyl)thiomethyl-6-chloro - 7 - sulfamyl - 3,4 - dihydrobenzothiadiazine-1,1-dioxide is 3.3, 2.1, and 8 times more potent in urinary output, natriuresis and chloruresis, respectively, than the corresponding compound in which the 2-substituent is hydrogen. In dogs, the former compound has greater total effect on the basis of maximal rates of saluresis.

The therapeutic agents of this invention may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excepients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is, intramuscularly, intravenously or subcutaneously. For parenteral administration they may be used in the form of a sterile solution containing other solutes, for example, enough saline or glucose to make the solution isotonic.

The physician will determine the dosage of the present therapeutic agents which will be most suitable and it will vary with the form of administration and the particular compound chosen, and furthermore, it will vary with the particular patient under treatment. He will generally wish to initiate treatment with small dosages substantially less than the optimum dose of the compound and increase the dosage by small increments until the optimum effect under the circumstances is reached. It will generally be found that when the composition is administered orally, larger quantities of the active agent will be required to produce the same effect as a smaller quantity given parenterally. The compounds are useful in the same manner as other diuretics and the dosage level is of the same order of magnitude as is generally employed with these other therapeutic agents. The therapeutic dosage will generally be from 1 to 10 milligrams per day and higher although it may be administered in several different dosage units. Tablets containing from 0.5 to 10 mg. of active agent are particularly useful.

In the foregoing, reference is made to pharmacologically acceptable cations. "Pharmacologically acceptable cations" has a definite meaning to one skilled in the art. It is defined as a non-toxic cation of basic compounds commonly used in pharmacology to neutralize acid medicinal agents when the salt thereof is to be used therapeutically. The pharmacological activity of the molecule is primarily a function of the anion, the cation serving chiefly to supply electrical neutrality. Commonly employed pharmacologically acceptable cations are, for example, sodium, potassium, calcium and magnesium. The salts of the compound of the present invention may be prepared employing conventional procedures. One such procedure involves treating the subject compounds with an aqueous solution containing an equivalent amount of the reagent, i.e. the pharmacologically acceptable base, followed by concentration of the resultant mixture to obtain the desired product. Pharmacologically acceptable bases are those which contain the cations described above. Such bases may be for example, oxides, hydroxides, carbonates or bicarbonates. Of course, salts formed with pharmacologically unacceptable bases, while not useful therapeutically, may be used in the purification of the present therapeutic agents and also in the preparation of the pharmacologically acceptable salts.

The above described 5-substituted-2,4-disulfamyl anilines may be prepared by procedures described in the literature, for example, the general procedures in Monatsch. Chem. vol. 48, p. 87 (1927), which involves the treatment of a meta-substituted aniline with from 10 to 20 parts by weight of chlorosulfonic acid followed by the gradual addition of from about 90 to 170 parts by weight of sodium chloride. The resultant mixture is heated at approximately 150° C. for about 2 hours after which the reaction mixture is poured into water and the resultant 5-substituted aniline-2,4-disulfonyl chloride is filtered and is then treated with concentrated ammonium hydroxide or suitable amine by standard procedures to obtain the corresponding disulfonamide. The meta-substituted anilines, for example, meta-chloro, meta-fluoro, meta-bromo, meta-nitro, meta-alkanoyl, meta-alkyl, meta-trifluoromethyl and meta-alkoxy anilines, may be readily obtained or prepared by standard procedures known to one skilled in the art. The various aldehydes employed in the present process are readily available or preparable by one skilled in the art.

This application is a continuation-in-part of application Serial No. 55,869, as filed September 14, 1960, now abandoned which in turn is a continuation-in-part of application Serial No. 33,644, filed June 3, 1960, and now abandoned.

The following examples are given by way of illustration and are not to be construed as limitations of this invention many variations of which are possible without departing from the scope and spirit thereof.

EXAMPLE I 3-(2,2,2-trifluoroethyl)thiomethyl-6-chloro-7-sulfamyl-3,4-dihydro-1,2,4-benzothiadiazine-1,1-dioxide To a stirred suspension of 11.4 g.(0.04 mole) of 5-chloraniline-2,4-disulfonamide in 60 ml. of 1,2-dimethoxyethane is added 9.8 g. (0.048 mole) of 2,2,2-trifluoroethylthioacetaldehyde dimethylacetal followed by 20 drops 12 N-hydrochloric acid. The resulting mixture is refluxed for 1½ hours, cooled and poured into 500 ml. of ice water with stirring. The crude product is filtered and dried to obtain 15.2 g. of material, M.P. 203–205° C. The product is recrystallized from acetone-benzene, M.P. 206°–207° C.

EXAMPLE II 2-methyl-3-(2,2,2-trifluoroethyl)thiomethyl-6-chloro-7-methylsulfamyl-3,4-dihydro-1,2,4-benzothiadiazine-1,1-dioxide A mixture of 0.03 mole of 5-chloro-2,4-di(methylsulfamyl)aniline and 0.033 mole 2,2,2-trifluoroethylthioacetaldehyde dimethylacetal in 15 ml. of 1,2-dimethoxyethane containing 12 drops of 12 N-hydrochloric acid is refluxed for 3 hours. The reaction mixture is then concentrated to half volume and diluted with 200 ml. of cold water, added dropwise. The gum which separates and solidifies is crystallized from methanol by water addition to obtain the purified crystalline product.

EXAMPLE III 2-methyl -3- (2,2,2 - trifluoroethyl)thiomethyl-6-chloro-7-sulfamyl-3,4-dihydro-1,2,4-benzothiadiazine-1,1-dioxide To 4.6 g. (0.015 mole) of 4-amino-2-chloro-5-(methylsulfamyl)benzenesulfonamide in 30 ml. of the dimethyl ether of ethylene glycol is added 4.08 g. (0.02 mole) of 2,2,2-trifluoroethylmercaptoacetaldehyde dimethyl acetal followed by 1 ml. of ethyl acetate saturated with hydrogen chloride gas. The resulting solution is refluxed for 1.5 hours, cooled and then slowly added to cold water dropwise with stirring. The crude product is filtered, dried and recrystallized from isopropanol (3.2 g.), M.P. 202°–202.5° C. A second recrystallization from isopropanol raised the melting point to 202°–203° C.

Elemental analysis gives the following results: Calcd. for $C_{11}H_{13}O_4N_3S_3ClF_3$—C, 30.0; H, 3.0; N, 9.6. Found—C, 30.1; H, 3.4; N, 9.5.

In the same manner, 2-ethyl-3-(2,2,2-trifluoroethyl)-thiomethyl-6-chloro-7-sulfamyl-3,4-dihydo - 1,2,4 - benzothiadiazine-1,1-dioxide is prepared from 4-amino-2-chloro-5-(ethylsulfamyl)benzenesulfonamide.

EXAMPLE IV

The following compounds are prepared according to the procedures of Examples I, II and III from corresponding starting compounds:

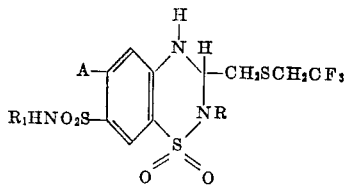

| A | R | R₁ |
|---|---|---|
| CH₃ | H | H |
| OCH₃ | H | H |
| CF₃ | H | H |
| Br | H | H |
| OC₂H₅ | H | H |
| C₂H₅ | C₂H₅ | C₂H₅ |
| CH₃ | CH₃ | CH₃ |
| CF₃ | CH₃ | CH₃ |
| OC₃H₇ | C₂H₅ | C₂H₅ |
| C₃H₇ | CH₃ | C₂H₅ |
| CH₃ | CH₃ | H |
| CF₃ | CH₃ | H |
| CH₃ | C₂H₅ | H |
| Cl | H | CH₃ |
| OCH₃ | CH₃ | H |
| CH₃ | H | CH₃ |

EXAMPLE V

*Trifluoroethylthioacetaldehyde dimethylacetal*

To 4.6 g. (0.2 mole) of metallic sodium dissolved in 75 ml. of absolute methanol is rapidly added 24.4 g. (0.2 mole) of mercaptoacetaldehyde dimethylacetal followed by dropwise addition of 42.0 g. (0.2 mole) of trifluoroethyl iodide.

The resulting reddish mixture is refluxed on a stream bath for one hour. One half of the alcohol is removed by concentration and the remainder diluted with several volumes of water and extracted with ether. The combined ether extracts are dried over sodium sulfate, the ether then removed at reduced pressure and the residue distilled to about 30 g. (B.P. 82°/25 mm.).

Analysis of the product gives the following results: Calcd. for $C_6H_{11}O_2SF_3$—C, 35.29; H, 5.43. Found—C, 35.57; H, 5.44.

EXAMPLE VI

The sodium salt of the Example I product is obtained by dissolving the product in water containing a molar equivalent of sodium hydroxide and then freeze-drying the mixture.

In this manner, the potassium, calcium and magnesium salts are also prepared.

EXAMPLE VII

A tablet base is prepared by blending the following ingredients in the proportion by weight indicated:

| | Percent |
|---|---|
| Sucrose, U.S.P. | 82.0 |
| Tapioca starch | 13.6 |
| Magnesium stearate | 4.4 |

Into this base there is blended a sufficient amount of 3-(2,2,2-trifluoroethyl) - thiomethyl-6-chloro-7-sulfamyl-3,4-dihydro-1,2,4-benzothiadiazine-1,1-dioxide to provide tablets containing 0.5, 2, 5 and 10 mg. respectively of active ingredient.

What is claimed is:

1. A compound selected from the group consisting of compounds of the formula:

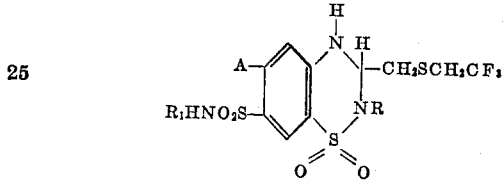

wherein:

A is selected from the group consisting of chloro, bromo, trifluoromethyl and lower alkyl and alkoxy; and R and $R_1$ are each selected from the group consisting of hydrogen, methyl and ethyl; and salts thereof with pharmacologically acceptable bases.

2. 3-(2,2,2 - trifluoroethyl)thiomethyl - 6 - chloro-7-sulfamyl-3,4-dihydro-1,2,4-benzothiadiazine-1,1-dioxide.

3. 2-methyl-3-(2,2,2-trifluoroethyl)thiomethyl-6-chloro-7-methylsulfamyl-3,4 - dihydro-1,2,4-benzothiadiazine-1,1-dioxide.

4. 2-methyl - 3 - (2,2,2 - trifluoroethyl)thiomethyl-6-chloro-7-sulfamyl-3,4-dihydro-1,2,4 - benzothiadiazine-1,1-dioxide.

No references cited.